Dec. 20, 1960 G. D. HARDEN 2,965,114
METHOD AND APPARATUS FOR CONTROLLING
THE PUMPING OF FLUIDS IN A PIPELINE
Filed Oct. 14, 1957 2 Sheets-Sheet 1

INVENTOR:
G. D. HARDEN
BY: J. H. McCarthy
HIS AGENT

Dec. 20, 1960 G. D. HARDEN 2,965,114
METHOD AND APPARATUS FOR CONTROLLING
THE PUMPING OF FLUIDS IN A PIPELINE
Filed Oct. 14, 1957 2 Sheets-Sheet 2

INVENTOR:
G. D. HARDEN
BY: A. H. McCarthy
HIS AGENT

United States Patent Office 2,965,114
Patented Dec. 20, 1960

2,965,114

METHOD AND APPARATUS FOR CONTROLLING THE PUMPING OF FLUIDS IN A PIPELINE

Gail D. Harden, Mooresville, Ind., assignor to Shell Oil Company, a corporation of Delaware Filed Oct. 14, 1957, Ser. No. 689,804

11 Claims. (Cl. 137—1)

This invention relates to the transportation of liquids through pipelines and pertains more particularly to a method and apparatus for separating or minimizing the intermingling of two different fluids being pumped through a common pipeline, one liquid following the other. The present method and apparatus are particularly suitable for use in pipelines used to transport different grades of petroleum products from a petroleum refinery to distribution areas which may be several hundred miles away.

At present, it is the general practice in operating petroleum products pipelines to pump large quantities ("slugs," "tenders," or "batches") of different fluids successively through a pipeline in the same direction. Inherent in the movement of multiple refined petroleum products through a products pipeline is the commingling of the contiguous volumes as they move throughout the system. The volume of the admixture is commonly referred to as an interface or an interfacial volume.

While theoretically the interface in a pipeline between two fluids such as kerosene and furnace oil should be a fairly well defined line, in actual practice no such line exists but instead there is an interface which may be many feet in length and which may constitute a considerable volume of fluid. For example, an initial interface between two different refined petroleum products in a fourteen-inch pipeline may vary anywhere from ten to eighty barrels of fluid. One cause of this large interface is due to the fact that valves in lines from tanks containing the two different refined products cannot be simultaneously and instantaneously opened and closed. Even if the valve of one tank could be instantaneously opened while the valve of the other tank was instantaneously closed, there would still be considerable intermixing of fluids when the two fluids met in the pipeline.

An initial interface of say fifty barrels of commingled petroleum products may increase many fold, frequently to from 10 to 20 times the original volume, by the time the two products have been pumped several hundred miles and have passed through several pumping stations. It is the large volume of these product admixtures, upon arrival at the pipeline terminus, which has curtailed somewhat the scope of this basic mode of refined product transportation. A more effective utilization of products pipelines systems depends upon the control of the volume of product interfaces between transported fluids. Since the admixtures comprise contaminated portions of each of the products being pumped through a pipeline, the contaminated portions must be carefully and accurately removed at the pipeline terminus so that they do not contaminate the pure products delivered to the storage tanks at that point. The admixed portions are reduced considerably in value as they generally must be reprocessed, blended or sold as a low grade product.

The technique of controlling the volume of commingled liquids between two different liquids in a pipeline is based on the following fundamental observations: Refined products moving in turbulent flow through a pipeline have, through a given cross sectional area of the stream, a range of velocities which vary from a maximum at the center of the pipeline to a minimum at the pipe wall. Interfacial mixing of refined products, which are moving contiguously through a pipeline, is primarily a function of the cross sectional liquid velocity differences. An alteration of the characteristic liquid velocity pattern throughout the volume of the interface is necessary to achieve adequate control of an interfacial mixture.

A solid body, for example a plug or go-devil, scraper, or separator having an elastic surface in full contact with and pressing against the inside pipe wall moves through the pipeline with a constant cross sectional velocity. However, its velocity relative to the velocity of the pipeline stream is a function of the effectiveness of the seal which is maintained between the solid body and the pipe wall. A solid body, which does not maintain an adequate seal with the pipe wall, fails to control the relatively slow velocity liquid near the pipe wall. The effect is a "flow back" of liquid across the body with the solid body gaining relative to its initial position in the stream.

Too tight a seal is accompanied by excessive wear of the solid body resulting in frequent breakdowns and failures, necessitating constant replacement of the solid body.

Solid bodies which maintain a constant positive seal with the pipe wall alter the characteristic cross sectional liquid velocity pattern. The effect is to reduce liquid velocity differences in close proximity to the solid, maintaining an approximate uniform cross section liquid velocity immediately in front and immedaitely in back of the solid. The liquid which is not immediately adjacent to the solid retains its characteristic cross sectional velocity pattern with the resultant commingling characteristics.

It is therefore a primary object of the present invention to provide a method and apparatus for controlling and holding to a minimum the volume of interfacial mixture between two different liquids being pumped consecutively through a pipeline.

A further object of this invention is to provide a method and apparatus for isolating or bracketing portions of an interfacial volume between two different liquids as they are being pumped through a pipeline.

These and other objects of this invention will be understood from the following description taken with reference to the drawing, wherein.

The method of isolating an interfacial volume at the source of a pipeline or maintaining at a substantially constant value the interfacial volume already formed in a pipeline between two different liquids being pumped consecutively without any stoppage of flow through said pipeline comprises positioning a plurality of solid bodies in spaced relationship throughout the length of said interfacial volume so that the effect is to move the total interfacial volume through the pipeline system at an approximate uniform cross sectional velocity.

Figure 1:
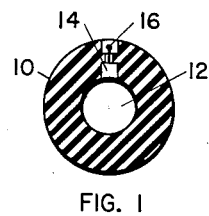
Figures 1 and 2 are solid bodies of a type to be employed in practicing the method of the present invention.
Figure 2:
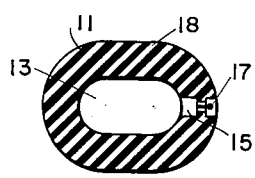

The solid bodies employed in practicing the present method may be in the form of plugs or short dumbbell-type scrapers but, for ease in handling, are preferably in the form of spheres or spheroids, as illustrated in Figures 1 and 2. While the sphere 10 of Figure 1 and the spheroid 11 of Figure 2 may be solid bodies, they are preferably formed with a cavity or hollow core 12 and 13 which are closed by means of valves 14 and 15. Recessed portions 16 and 17 are formed in the wall of the members 10 and 11 so that the valves 14 and 15 will not be damaged as the outer surface of the solids 10 and 11 wears away in its travel through a pipeline. If desired, the cavity or hollow core 12 and 13 can be filled with a solid sphere of non-elastic material which is inserted during the molding process and remains during the life of the sphere or spheroid.

The solid bodies, such as the sphere 10 and spheroid 11, are preferably made of rubber, either synthetic or natural, or a combination thereof, or a plastic material, either material being of a suitable hardness and elasticity and the walls of sufficient thickness to give sufficient structural strength to the sphere so as to maintain a tight fit and hence a good seal against the pipe wall while passing through the pipeline. Spheroids with a 40 to 50 durometer hardness were found to have excellent wear qualities. Wall thicknesses of at least one one-fifth the radius of the spheres are preferred.

At the same time it is preferred that the spheres or spheroids be made of a material that is slightly resilient so that the spheres can be inflated and expanded slightly to the desired diameter. For example, it has been found that a spheroid that has traveled about four hundred miles through a fourteen-inch pipeline became a quarter of an inch smaller in diameter by the end of its travel. Prior to reinserting the spheroid into the pipeline it is inflated slightly so that it again has its original diameter. The spheres and spheroids are preferably inflated with a noncompressible liquid, such for example, as water. At times it may be desirable to use a liquid lighter than water to reduce the weight of the spheroid and make it more nearly equal to that of the fluid being pumped through the pipeline. During the winter season in northern areas the spheroids are filled with a liquid that will not freeze, for example 50-50 mixture of water and ethylene glycol, or with any suitable petroleum product. In the case of spheres or spheroids employing solid cores, liquid can be forced into the interstice between the solid core and the elastic body.

The cross sectional diameter of the spheres and spheroids is critical and must be maintained. This is done by reinflating the spheres and spheroids from time to time as they become worn during their travel through the pipeline. The diameter of the spheres and the minor axis of the spheroids should be slightly greater than the inside diameter of the pipeline through which they are to travel. If the diameter of a sphere or the minor axis of a spheroid is too great, it will not pass through the pipeline readily and there will be excessive wear on its outer surface. On the other hand if the diameter of the sphere or the minor axis of the spheroid is too small, a poor seal will be established between the sphere or spheroid and the wall of the pipe so that there is excessive "flow back" of liquid across the sphere or spheroid. When no seal at all is provided between the exterior of the sphere or spheroid and the interior of the pipe or when the sealing surface of the sphere or spheroid breaks down or is damaged, "flow forward" of liquid across the sphere or spheroid will result.

The optimum size for the sphere or the minor axis of the spheroid must be determined for the particular inside pipe diameter. It was found that the optimum diameter of a sphere or the minor axis of a spheroid to be used in a certain fourteen-inch pipeline should be between thirteen and seven-sixteenths inches and thirteen and five-eighths inches.

The length of the substantially-flat portion 18 formed or allowed to wear on the spheroid 11 of Figure 2 is not too critical but is dependent on the increased sealing area desired or needed to effectively separate two liquids of considerably different gravities. Spheroids are superior to spheres in one respect in that the flat portions 18 of a plurality of spheroids provide a better wiping action on the inner wall of a pipeline, thus tending to remove better the preceding liquid therefrom.

Figure 4:
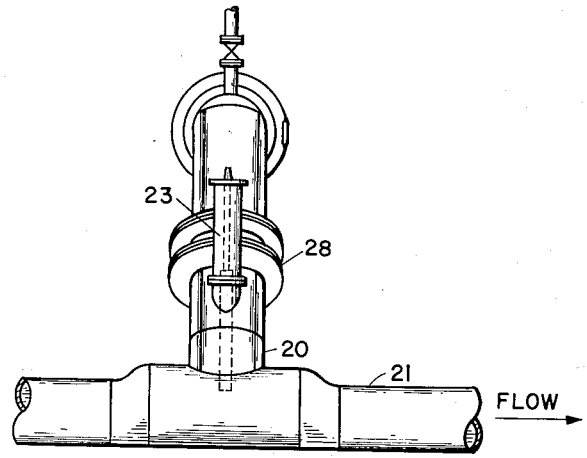
Figures 3 and 4 are side and end views, respectively, of apparatus for launching the solid bodies of Figures 1 and 2 into a pipeline.
Figure 3:
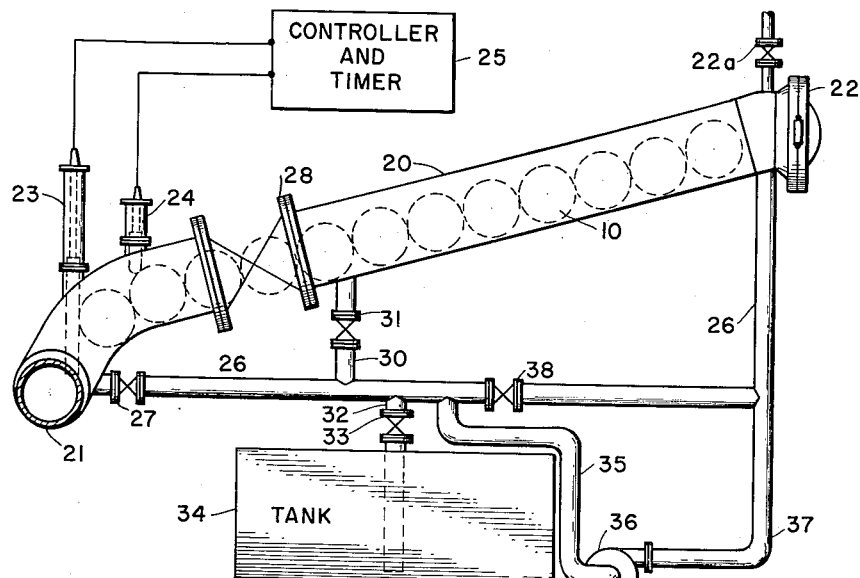

Since the present method contemplates the placement of at least two, preferably three, and often as many as ten or more spheres or spheroids in the interface volume between two liquids in a pipeline, an apparatus is provided as shown in Figures 3 and 4 for launching these spheres or spheroids into a pipeline at a predetermined rate so that the spheres are in spaced relationship when they are propelled through the pipeline. The sphere-launching apparatus may comprise a slightly oversize section of pipe 20 secured to a full-opening valve 28. With valve 28 open, pipe 20 is in open communication with the main pipeline 21. As illustrated in Figures 3 and 4, the launching pipe 20 is positioned above the carrier pipeline 21 in such a manner as to allow the spheres or spheroids to slide, fall or roll into the main line. The launching pipe 20 and the main line 21 at the point of introduction are sufficiently larger than the spheres or spheroids to allow their free movement. An angle of 15° above the horizontal has been selected only so that the loading end of the launching pipe is low enough for ease in loading spheres into it. The loading end of the launching pipe is closed in a fluidtight manner by any suitable cover 22. Valve 28 is provided in the lower end of the launching pipe 20 as a means of isolating the launching pipe 20 from the main carrier pipe 21, thus permitting the loading spheres into the launching pipe 20 without interrupting liquid flow through the main carrier pipe 21.

Fixedly secured to the launching pipe 20 near the launching end thereof are suitable launching control devices comprising, for example, one or more pistons adapted to be actuated for controlling the launching of one sphere at a time into the main pipeline 21. As shown in Figure 3 the launching apparatus is supplied with two pistons 23 and 24 mounted on the top of the launching tube 20 and extending thereinto. In this case two pistons are used, a launching or "release" piston 23 acting to control the time of actual release of sphere or spheroid into the carrier pipe 21, while the other piston acts as the "hold" piston. Both pistons 23 and 24 may be operated manually but are preferably connected to an automatic controller and timer for actuating the pistons either electrically, pneumatically, hydraulically or mechanically.

In operation, "release" piston 23 is raised every time it is desired to drop a sphere 10 into the pipeline 21. At the same time "hold" piston 24 holds the rest of the spheres 10 in the launching tube 20 from rolling downward. After moving piston 23 so that it extends into the launching tube 20 again, the "hold" piston 24 is withdrawn so that another sphere rolls past it to be positioned against piston 23.

A by-pass line 26 is connected between the lower end of the launching tube 20 or the main carrier pipeline 21 and the loading end of the launching tube 20. With valves 27 and 38 in said line open, a small portion of fluid will be circulated from the main pipeline 21, up through launching tube 20 through conduit 26, valve 38 and valve 27, thereby permitting the fluid in the tube 20 to be continually changed so that it will be at all times the same as the fluid in the main carrier pipeline 21. Additionally, a short conduit 30 is provided adjacent valve 28 in communication between the lower end of the launching tube 20 and conduit 26, said conduit 30 having a valve 31 therein. Conduit 26 is also connected by means of a conduit 32 and valve 33 to a tank 34. The suction line 35 of pump 36 is connected to conduit 26 on the main side of valve 38 and the discharge 37 of pump 36 is communicated to conduit 26 on the launching tube 20 side of valve 38.

Thus, when it is desired to load more spheres into the launching tube 20, valves 27 and 28 are closed and valves 31, 33 and 22A are opened to allow fluid in the launching tube 20 to drain into the storage tank 34. The fluid-tight cover 22 is then removed from the launching tube 20 and additional spheres are inserted into the tube. After closing cover 22 and valves 31 and 38, pump 36 is started to return the fluid from the tank 34 into the loading tube 20. After the launching tube is filled with liquid, valve 22A is closed, the pump turned off, valves 27, 28 and 38 are opened and the system is ready for operation.

Pressure differential in the carrier pipeline arising from the change in pipe diameter at the introduction point in combination with the pressure drop at the throat of the reduced pipe size will normally be sufficient to displace liquid from the launching barrel, through conduit 26 and valves 28 and 27, back into the main carrier line. In the event that a rapid displacement rate is desired for the fluid in the launching tube 20, it is possible to close valves 33, 38 and 31 and pump fluid from the main line through valve 27 to the top of the launching tube 20 and thence return to the main line.

The shape of the spheres and spheroids facilitates their handling in the launching apparatus and their insertion into the pipeline 21. They roll readily and do not hang up on any obstructions in the pipeline or launcher. However, short plugs or scrapers may also be used. In order that spheroids may roll in the launching barrel, they are inserted therein with their major axis transverse to the launching barrel.

Figure 5:
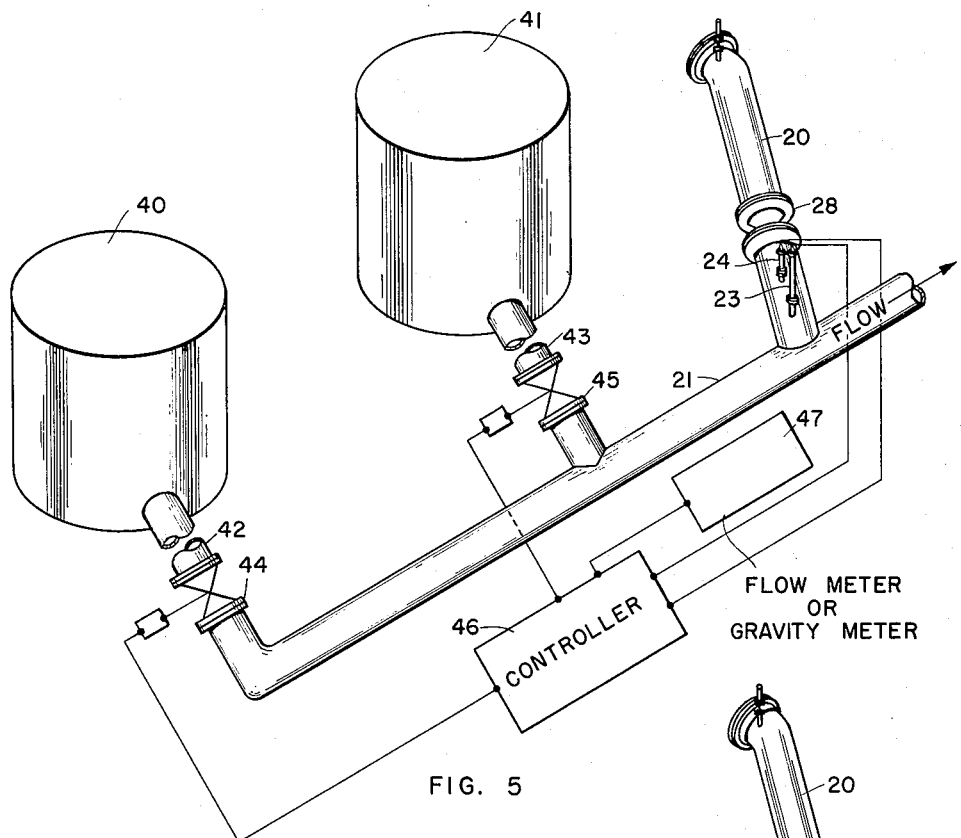
Figure 5 is a diagrammatic view illustrating the launching apparatus of Figure 3 mounted on a pipeline which is in communication with at least two storage tanks containing fluids of different composition.

In Figure 5, two storage tanks 40 and 41 are shown as being connected by means of conduits 42 and 43 to a main pipeline 21. The two tanks 40 and 41 contain different liquids, for example fuel oil and kerosene, respectively. The conduits 42 and 43 are equipped with power-actuated valves 44 and 45 which are connected through a controller 46 which also controls the action of the pistons 23 and 24 in the launching tube 20. The system is provided with a suitable flow meter 47 which is operatively connected to the pipeline 21 downstream of said storage tanks 40 and 41 and upstream of said launching tube 20. The flow meter 47 is adapted to measure the quantity of the fluid delivered to the pipeline. Preferably the flowmeter is of the type known as a "preset" or "predetermining register" flowmeter on which a volume figure may be set. After a volume of fluid equal to that figure has passed through the meter, the meter is adapted to create or initiate an electrical signal which may be used to open or close a valve or to perform any other function. If desired a gravity meter, capacitance cell, refractive-index device, or a radioactive tracer indicator device can be used to detect an interface at the launching tube 20.

For example, if valve 45 was open so that a quantity of kerosene was being delivered into pipeline 21, at the end of this delivery of a predetermined volume of kerosene the controller 46 would automatically close valve 45 and open valve 44 in conduit 42 thus starting a delivery of a quantity of fuel oil from tank 40 into pipeline 21. When the beginning of the fuel oil tender came in contact with the end of the kerosene tender a volume of commingled kerosene and fuel oil, or an interfacial volume of the two liquids, would be formed. If pipeline 21 was a fourteen inch pipe, the interfacial volume may be in order of from ten to sixty barrels of liquid. When a volume of product equal to the volume of product contained between valve 44 and launcher tube 20 has passed the meter 47, a signal is transmitted by the flow meter 47 to the controller 46 which then actuates pistons 23 and 24 to release a sphere in the first portion of the interfacial volume and to position another sphere ready for releasing. If a gravity meter is employed, it can be used to detect the interface and actuate controller 46. The controller 46 is preferably provided with a time delay mechanism so as to delay the launching of the first sphere in the pipeline 21 until the desired part of the interfacial volume is adjacent the launching tube 20. The time delay between the launching of the first spheroids and the time at which the first break in gravity passes the gravity meter is a function of the velocity of the stream.

Alternatively, instead of employing a flow or gravity meter to detect or measure a condition of the pipeline system, i.e., to measure and indicate the arrival of an interfacial volume in the fluid stream, the controller with its time delay mechanism may be set to actuate pistons 23 and 24 a certain number of seconds after valve 45 has been closed and valve 44 opened. In this case the time delay between the launching of the first spheroid from the launching tube 20, and the opening of valve 44 with the simultaneous closing of valve 45, would be a function of the total volume of fluid between the open valve 44 and the launching tube 20 as well as being a function of the velocity of the liquid stream in the pipeline 21. Thus, to employ this time method of launching spheres, the flow rate in the pipeline must first be measured or known, and the volume of liquid between the launching tube and the valves 44 and 45 must be known.

The desired number of remaining spheres or spheroids in the launching tube 20 are then automatically launched by the controller at predetermined time or volume intervals, the duration of which depends upon the spacing in feet or volume desired between the individual spheres as they pass through the pipeline. For example, where the interfacial volume between two products is twenty barrels and it is desired to have spheroids placed in this volume at five-barrel intervals, a total of five spheres would have to be launched into the pipeline. The number of spheres or spheroids to be employed in any interfacial volume depends upon the piping system of each individual pumping station as well as the compatibility or ease with which two products mix when pumped next to each other through a pipeline. At least two spheroids must be launched into any interfacial volume and as many as ten or more may be employed in some circumstances with certain liquids.

Figure 6:
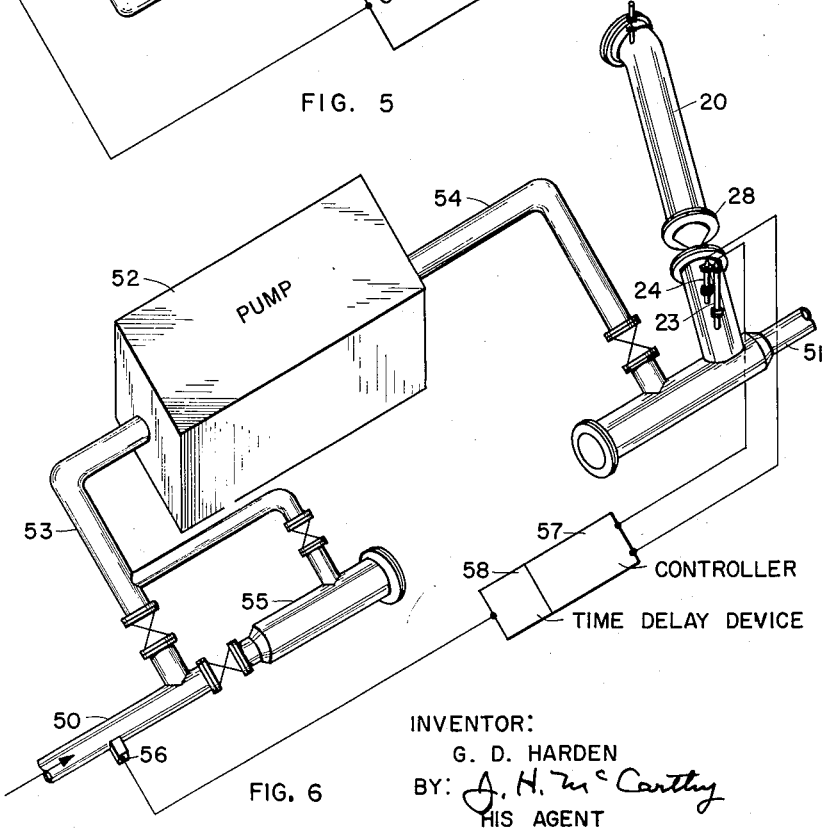
Figure 6 is a diagrammatic view illustrating apparatus to be used upstream and downstream of a pump station for removing the body members of Figures 1 and 2 from a pipeline and reinserting similar body members into the pipeline downstream of said pump station.

In Figure 6 a pumping station is shown having an incoming pipeline 50, an outgoing pipeline 51, and a pump 52 connected to lines 50 and 51 through by-pass conduits 53 and 54. On the inlet side of the pump the incoming pipeline 50 is provided with a scraper receiver barrel 55 into which spheres or spheroids being propelled from an upstream point are collected while the fluid in the pipeline is sent through conduit 53 to the pump 52. The pipeline is also provided with any suitable type of scraper indicator device 56, such for example, as the one shown in U.S. Patent 2,698,363 to Rush which issued December 28, 1954. The scraper indicator device 56 is operatively connected to a controller 57 having a time delay device 58. Controllers 46 and 57 may be of any suitable type employed in either electric, pneumatic or hydraulic service. As the first sphere or spheroid passes the scraper indicator device 56, indicating the arrival of the interfacial volume, a signal sent by the scraper indicator device 56 to the controller 57 and time delay device 58 actuates the controller 57 which, after a preset time interval, energizes pistons 23 and 24 in launching tube 20 thereby dropping the first sphere from tube 20 into the outgoing pipeline 51 at the exact moment that the first part of the interfacial volume passes the end of tube 20. The time delay between a spheroid hitting the scraper indicator device 56 and the time at which a corresponding sphere is dropped from the launching tube 20 is a function of the velocity of the fluid stream and the volume of fluid between the scraper indicator device 56 and the launching barrel 20. All of the arriving spheres are caught in the scraper receiver barrel 55 from which they are later removed and loaded into the launching barrel 20. With the arrangement shown in Figure 6 of the drawing, the spheres are launched from barrel 20 into the outgoing pipeline 51 with the same spaced interval between them that exists when they pass the scraper indicator device 56 on their arrival in the incoming pipeline 50.

In pipeline operations, the present apparatus for minimizing the interfacial volume between two different petroleum products in a pipeline was found to be far more efficient than any other type of previously known apparatus. A single scraper of the dumbbell type having a single wiper disk element at each end was tested to determine its efficiency in separating two different liquids in a pipeline with very poor results. A 40% reduction in interfacial volume was realized only after the scraper was modified in that it was thirty-six inches long and was provided at each end with five pairs of soft rubber disks (i.e. a total of 20 wiping or contact surfaces), each pair spaced about an inch from the adjacent pairs. The device was subject to frequent breakdowns and was very heavy weighing over two hundred and fifty pounds. When used a pipeline between range fuel and premium grade motor gasoline over a seventy-six mile distance, the interfacial volume between the two liquids on either side of the scraper increased one hundred-sixty barrels in volume.

In another test a pair of dumbbell-type scrapers having a two-disk unit at each end of the scraper and being thirty-six inches long were launched in spaced relationship (20 barrels of liquid between the scrapers) in an interface between regular grade motor gasoline and kerosene. With the scrapers being run in spaced relationship in accordance with the present invention a 40% reduction in interfacial volume was realized with the pair of scrapers employing 60% less wiping or contact discs than the single scraper of the previous test.

A further decrease in the formation of interfacial volume is enjoyed when additional scrapers or other solid bodies are run in spaced relationship. For example, in another test when five solid bodies were launched at spaced intervals in this same fourteen-inch pipeline in accordance with the present invention there was only a forty barrel increase in the interfacial volume between gasoline and burning oil over the same seventy-six mile run. Without any solid bodies in the same type of an interface, the volume thereof increased two hundred-thirty barrels. Hence, an 83 percent reduction in the formation of an interfacial volume was realized by using five spaced bodies.

In a further test to determine the necessity of spacing of scrapers, spheroids or spheres in a pipeline, four spheres were launched simultaneously in a pipeline at the first break of an interfacial volume. No decrease in the interfacial volume was realized over that formed when a single solid body was used.

Numerous tests with the present method indicate that the spacing, i.e., the volume of fluid, between the solid bodies moving in an interfacial volume varies greatly and should preferably be determined for each pipeline system. In addition the liquid products being transported may affect the desired spacing between solid bodies. As a general rule of thumb, good results may be obtained on most 8 inch pipeline systems handling most petroleum products if there is about 5 to 7 barrels of product between the spaced solid bodies. For a 14 inch pipeline a preferred spacing is 14 to 21 barrels while in other pipelines volumes ranging from 1 to 50 barrels may give optimum results. Alternatively, a volume equal to the fluid contained in about one hundred linear feet of the pipeline has been found to be satisfactory.

I claim as my invention:

1. A method for controlling the interfacial volume formed in a continuously flowing stream between two liquids of different physical properties being pumped successively through a pipeline system, said method comprising inserting movable barriers in said interfacial volume of said continuously flowing stream, said movable barriers being in movable spaced relationship with each other and substantially closing the cross-sectional area of said pipeline with at least one barrel of fluid between each two barriers when they are inserted, simultaneously moving said interfacial volume and said barriers through said pipeline, and subsequently removing said barriers from said pipeline stream.

2. A method for controlling the interfacial volume forming in a continuously flowing stream between two liquids of different physical properties being pumped successively through a pipeline system, said method comprising detecting said interfacial volume in said flowing pipeline stream, inserting movable barriers of said interfacial volume of said continuously flowing stream, said movable barriers being in movable spaced relationship with each other and substantially closing the cross-sectional area of said pipeline with at least one barrel of fluid between each two barriers when they are inserted, simultaneously moving said interfacial volume and said barriers through said pipeline, and subsequently removing said barriers from said pipeline stream.

3. A method for controlling the interfacial volume formed in a continuously flowing stream between two liquids of different physical properties being pumped successively through a pipeline system, said method comprising detecting said interfacial volume in said flowing pipeline stream, bracketing portions of said interfacial volume of said continuously flowing stream by inserting movable barriers in said flow stream in movable spaced relationship with each other and extending over substantially the cross-sectional area of said flow stream with at least one barrel of fluid between each two barriers when they are inserted, simultaneously moving said interfacial volume and said barriers through said pipeline, and subsequently removing said barriers from said pipeline stream.

4. A method for controlling the interfacial volume formed in a continuously flowing stream between two liquids of different physical properties being pumped successively through a pipeline system, said method comprising detecting the location of said interfacial volume in said flowing pipeline stream by measuring and indicating a condition of said pipeline system, bracketing portions of said interfacial volume of said continuously flowing stream by inserting a plurality of movable barriers in said flow stream in movable spaced relationship with each other and extending over substantially the cross-sectional area of said flow stream with at least one barrel of fluid between each two barriers when they are inserted, simultaneously moving said interfacial volume and said barriers through said pipeline, and subsequently removing said barriers from said pipeline stream.

5. A method for controlling the interfacial volume formed in a continuously flowing stream between two liquids of different physical properties being pumped successively through a pipeline system, said method comprising detecting the location of said interfacial volume in said flowing pipeline stream by measuring and indicating a change in physical properties at a given point in said pipeline system, bracketing portions of said interfacial volume of said continuously flowing stream by inserting a plurality of movable barriers in said flow stream downstream of said given point, said movable barriers being in movable spaced relationship with each other and extending over substantially the cross-sectional area of said flow stream with at least one barrel of fluid between each two barriers when they are inserted, simultaneously moving said interfacial volume and said barriers through said pipeline, and subsequently removing said barriers from said pipeline stream.

6. A method for controlling the interfacial volume formed in a continuously flowing stream between two liquids of different physical properties being pumped successively through a pipeline system, said method comprising detecting the location of said interfacial volume in said flowing pipeline stream, bracketing portions of said interfacial volume of said continuously flowing stream by inserting two or more movable barriers in said flow stream in movable spaced relationship with each other and extending over substantially the cross-sectional area of said flow stream with at least one barrel of fluid between each two barriers when they are inserted, simultaneously moving said interfacial volume and said barriers through said pipeline, and subsequently removing said barriers from said pipeline stream, said barriers being spherically-shaped solid objects having a diameter slightly greater than the inside diameter of said pipeline.

7. A method for controlling in a pipeline stream the interfacial volume formed between two liquids of different physical properties being pumped successively as a continuously flowing stream through a pipeline system, said method comprising detecting said interfacial volume in said flowing pipeline stream, inserting from five to twelve movable barriers in said interfacial volume of said continuously flowing stream, said movable barriers being in movable spaced relationship with each other and extending over substantially the cross-sectional area of said pipeline with at least one barrel of fluid between each two barriers when they are inserted, simultaneously moving said interfacial volume and said barriers through said pipeline stream, said barriers being spheroidal-shaped objects of slightly expansible material and having central cavities filled with a substantially non-compressible liquid.

8. A method for controlling in a pipeline stream the interface volume formed between two liquids of different physical properties being pumped successively as a continuously flowing stream through a pipeline system, said method comprising detecting said interfacial volume in said flowing pipeline stream, inserting two or more movable barriers in said interfacial volume, said movable barriers being in movable spaced relationship with each other and extending over substantially the cross-sectional area of said pipeline with at least one barrel of fluid between each two barriers when they are inserted, simultaneously moving said interfacial volume and said barriers through said pipeline, and subsequently removing said barriers from said pipeline stream, said barriers being used to actuate a controller which automatically operates valves to switch each liquid into the correct storage tank at the pipeline terminus.

9. Apparatus for inserting into a pipeline a plurality of solid bodies being circular in at least one cross sectional plane, said apparatus comprising a launching tube in open communication at one end with the pipeline, said tube having an inner diameter at least slightly larger than the maximum dimension of the solid bodies to be contained therein and a length sufficient to contain a plurality of said solid bodies, removable means closing the other end of said tube in a fluidtight manner, said tube being positioned at an angle above the horizontal at least sufficient to cause the solid bodies to roll through the tube, launching means positioned in said tube near the pipeline normally holding the solid bodies in the tube, and controller means including timing means operatively connected to said launching means for actuating said launching means to release a predetermined number of solid bodies one at a time at predetermined time intervals, thereby allowing said solid bodies to drop into said pipeline.

10. Apparatus for inserting into a pipeline a plurality of solid bodies being circular in at least one cross sectional plane, said apparatus comprising a launching tube in open communication at one end with the pipeline, said tube having an inner diameter at least slightly larger than the maximum dimension of the solid bodies to be contained therein and a length sufficient to contain a plurality of said solid bodies, removable closure means closing the other end of said tube in a fluidtight manner, said tube being positioned at an angle above the horizontal at least sufficient to cause the solid bodies to roll through the tube, launching means positioned in said tube near the pipeline normally holding the solid bodies in the tube, controller means operatively connected to said launching means for actuating said launching means to release a predetermined number of solid bodies one at a time at predetermined time intervals, and conduit means in communication between said pipeline and the closed end of said launching tube for circulating at least a small amount of pipeline fluid through the launching tube.

11. Apparatus for inserting into a pipeline a plurality of solid bodies being circular in at least one cross sectional plane, said apparatus comprising a launching tube in open communication at one end with the pipeline, said tube having an inner diameter at least slightly larger than the maximum dimension of the solid bodies to be contained therein and a length sufficient to contain a plurality of said solid bodies, removable closure means closing the other end of said tube in a fluidtight manner, said tube being positioned at an angle above the horizontal at least sufficient to cause the solid bodies to roll through the tube, launching means positioned in said tube near the pipeline normally holding the solid bodies in the tube, controller means operatively connected to said launching means for actuating said launching means to release a predetermined number of solid bodies one at a time at predetermined time intervals, conduit means in communication between said pipeline and the closed end of said launching tube for circulating at least a small amount of pipeline fluid through the launching tube, a tank in communication with said conduit means, valve means between said tank and conduit means, and a pump in communication with said tank and said conduit means for returning fluid from the tank to the launching tube.

References Cited in the file of this patent

UNITED STATES PATENTS

| | | |
|---|---|---|
| 1,808,870 | Strasburg | June 9, 1931 |
| 2,623,226 | Jones | Dec. 30, 1952 |
| 2,685,685 | Lathrop | Aug. 3, 1954 |
| 2,705,419 | Chawner | Apr. 5, 1955 |
| 2,729,839 | Holt | Jan. 10, 1956 |
| 2,790,500 | Jones | Apr. 30, 1957 |
| 2,796,878 | Atkinson | June 25, 1957 |